June 13, 1967  W. J. HIGGINS, JR  3,324,575
EDUCATIONAL AID
Filed Jan. 4, 1965  3 Sheets-Sheet 1
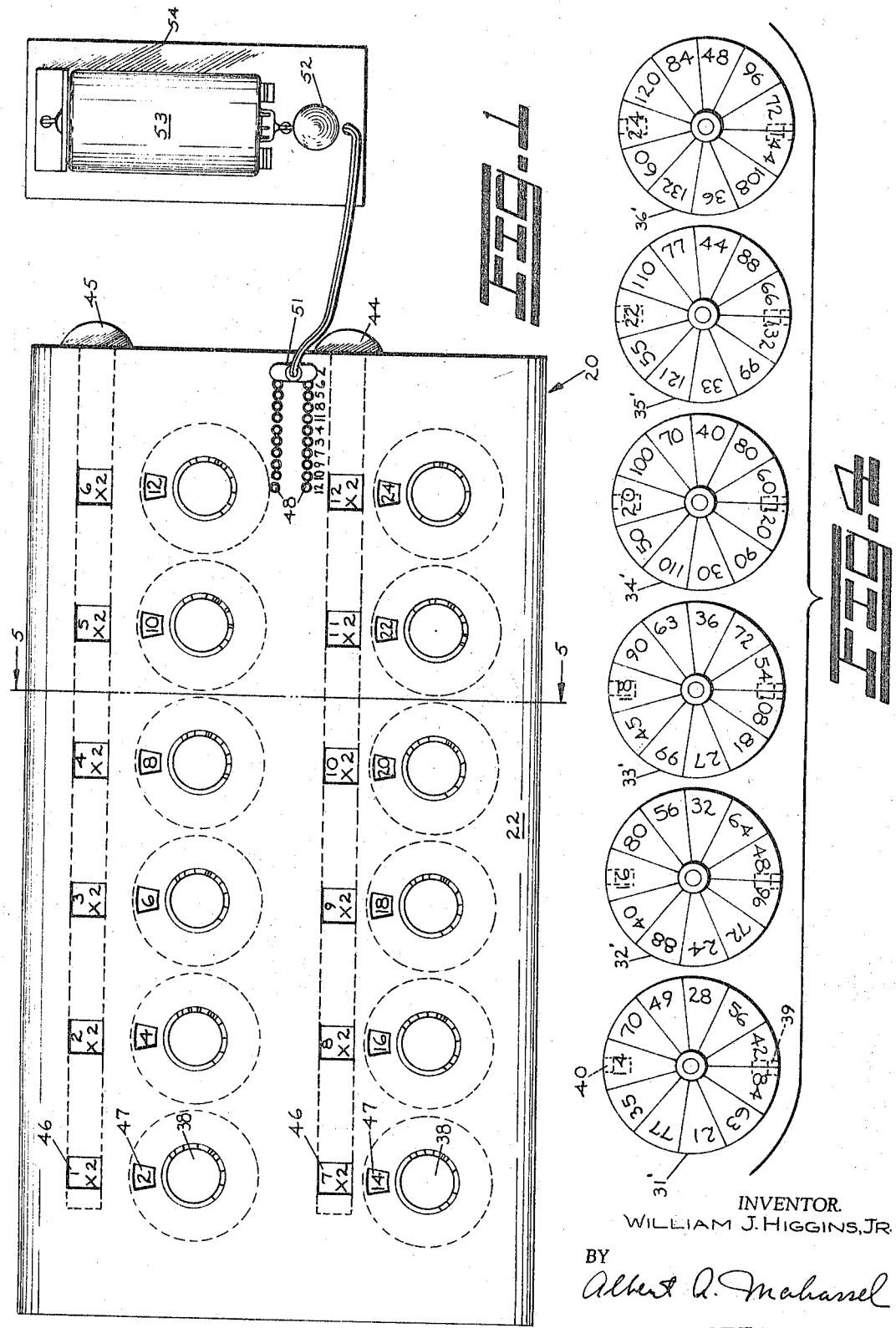
INVENTOR.
WILLIAM J. HIGGINS, JR.
BY
Albert Q. Mahassel
ATTORNEY June 13, 1967  W. J. HIGGINS, JR  3,324,575
EDUCATIONAL AID
Filed Jan. 4, 1965  3 Sheets-Sheet 2
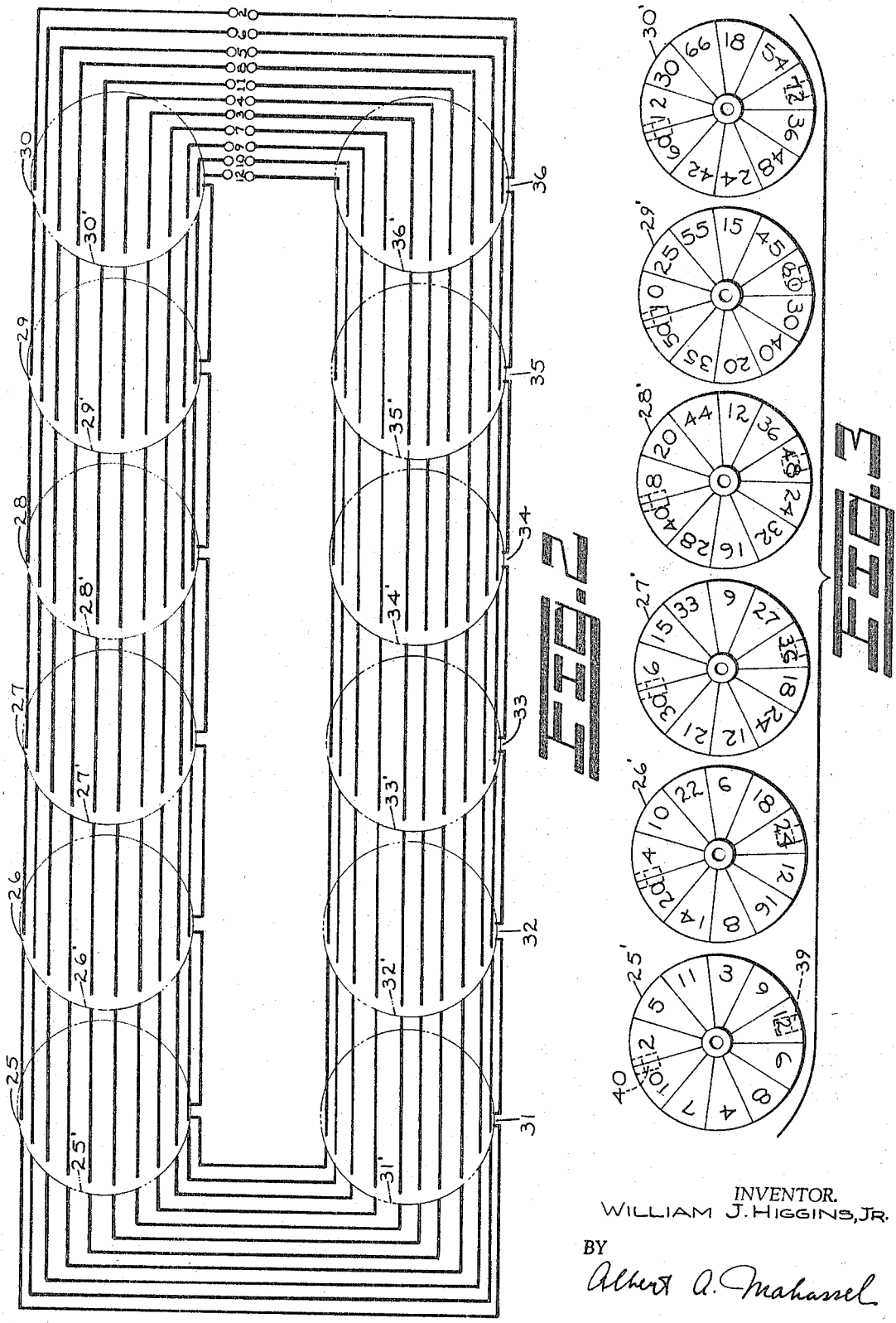
INVENTOR.
WILLIAM J. HIGGINS, JR.
BY
Albert A. Mahassel
ATTORNEY

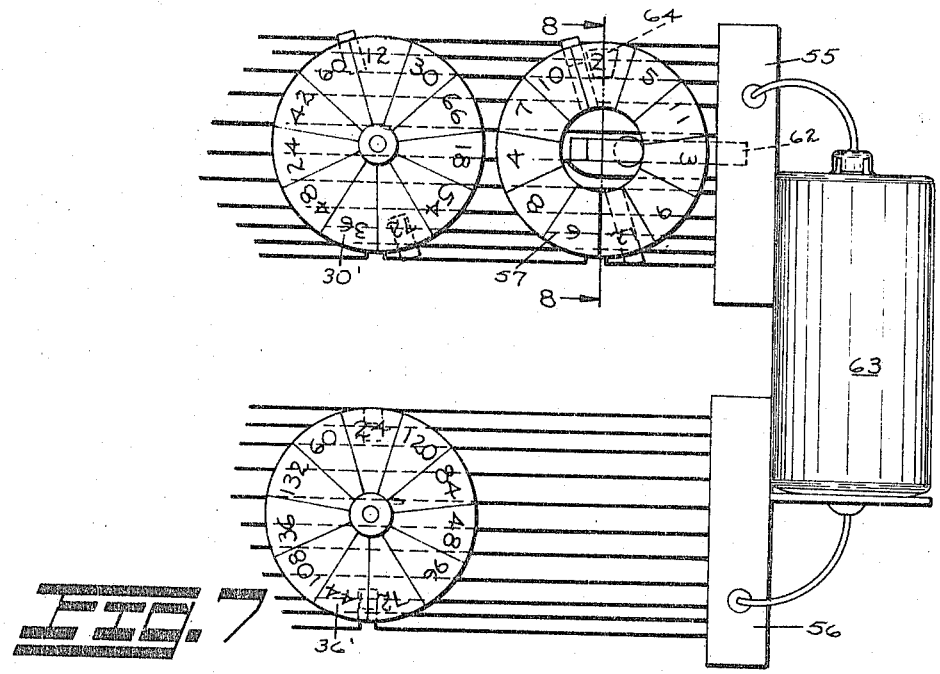
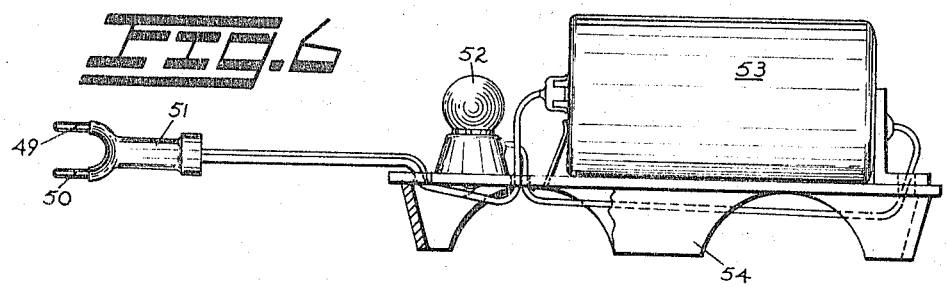
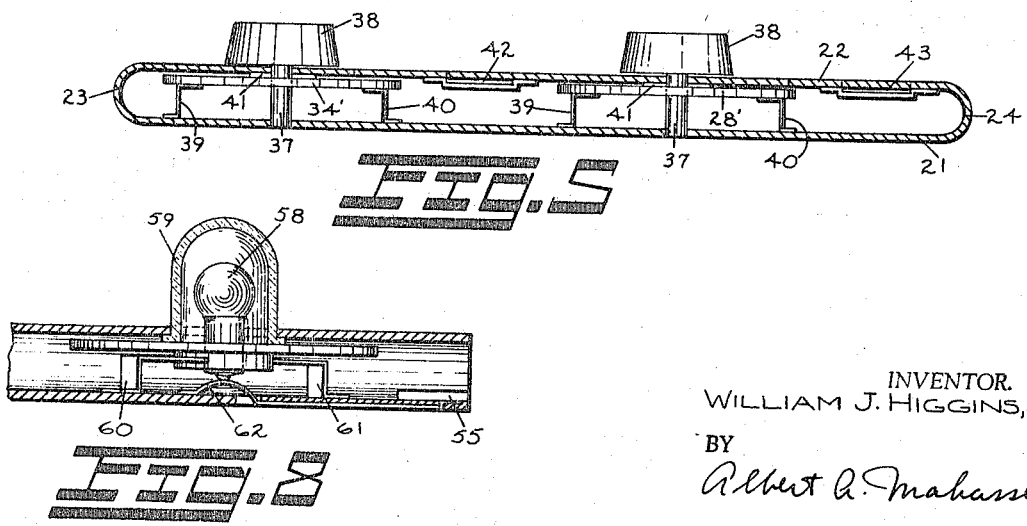
INVENTOR.
WILLIAM J. HIGGINS, JR.
BY
Albert A. Mahassel
ATTORNEY United States Patent Office 3,324,575
Patented June 13, 1967

3,324,575
EDUCATIONAL AID
William J. Higgins, Jr., 5 S. Buffum St.,
Worcester, Mass. 01603
Filed Jan. 4, 1965, Ser. No. 422,905
8 Claims. (Cl. 35—31)

This invention relates to an electro-mechanical apparatus which may be used as an educational aid and, more particularly, to a self-teaching device for use in the memorizing of the multiplication tables.

It is the general object of the invention to provide a mechanism to facilitate, expedite, and aid in the teaching and learning of solutions to mathematical problems.

It is a more specific object to provide a mechanism which will be a stimulus to the learner in the successful completion of a series of multiplication factors, the answer to each of which is selectively chosen and upon the completion of the selection of answers of a given series, that entire series may be simultaneously checked for accuracy in a very simple manner.

It is a still further object to provide a simple, inexpensive, electro-mechanical device which will aid in the self-learning of the multiplication tables without the aid of an instructor.

It is a further object to provide a teaching aid which encourages and aids in the memorization of correct answers to multiplication factors through repetitious practice and which incorporates a checking device which indicates the accuracy of answers to an entire series of problems, simultaneously.

It is still another object to provide a teaching aid as outlined which is simple enough to operate even for a very young child just beginning school.

It is a more specific object to provide a mechanism including a base member having imprinted thereon a plurality of symmetrical, interrupted circuits each of which relates to one set of multiplication problems or factors to be solved, multiple choice answers to each of the problems of a set being indicated on two series of aligned discs, the correct choice of each of which results in the closing of each of the interruptions in a given circuit except a gap provided at the limits of that circuit and into which a proof reader may be connected to indicate the correctness of that entire set of answers.

Further objects of the invention will be apparent from the detailed description set forth hereinafter.

Many educational devices have been heretofore proposed to aid in teaching any number of subjects. One of the serious disadvantages of these prior art devices which has been overcome by the present invention is the relative complexity of these devices and the resultant expense thereof. No practical mechanism is presently known by means of which a complete set of multiplication factors may be answered and checked simultaneously.

In general, the present invention comprises a supporting base upon which is applied a series of printed circuits each of which includes selectively positioned gaps or interruptions, twelve in number for each circuit since the device is being arbitrarily illustrated and described for aiding in teaching the solution to factors of numbers up to twelve times numbers from two to twelve, or, in other words, the two's table, the three's table, etc., up to the twelve's table. Each of the circuits represents one of the tables and the circuits are preferably laid out in rectangular form and terminate in two rows of opposed points to be contacted by a bulb-containing further circuit which will check the accuracy of the results. To sets of aligned discs, six in each set, are superimposed above the circuits and each disc contains along the outer periphery of the upper face thereof eleven predetermined numbers which represent the product of the factors to be solved, one correct answer only appearing on each disc for one set of factors of a given table. Additionally, each disc includes on its underside a conducting member or members the extremities of which form gap closers, but only one of the gap closers of each disc being effective in the solution of a given problem.

A cover plate overlies the discs except for a knob connected to each disc for rotation thereof. The cover may include on its underside a pair of longitudinally extending channels or pockets each spaced laterally with respect to each row of discs. Further, the cover includes a window or opening adjacent each disc and overlying one of the pockets so that there are six windows overlying each pocket. A card is adapted to be inserted into each of the pockets and each has imprinted thereon in alignment with the windows one half of the series of factors of a given table. For example, in the case of the two's table one card will have imprinted thereon the multiplication factors from one times two to six times two and is insertable into one of the pockets while the second card will have imprinted on it the factors from seven times two to twelve times two and is insertable into the second pocket. The cover further includes an answer window just overlying the twelve o'clock position of each disc.

Finally, a proof reader incorporating a pair of probes connected to a light bulb via a dry cell is provided, the probes being insertable into the points comprising the terminals of the circuit corresponding to the table whose factors are to be solved and the bulb will light if the correct answers appear in the answer windows of all the discs due to the fact that the gap closers of each of the twelve discs have bridged the twelve gaps of that particular circuit.

In a modification of the invention the proof reader may comprise a check disc in alignment with one of the disc rows and similar in construction to the discs previously described but incorporating a bulb connected to a dry cell. In this case merely setting the table being worked into the answer window will cause the bulb to light if all the correct answers have been selected on the twelve answer discs.

A more complete understanding of the invention will be had by reference to the following detailed description and to the figures of drawing, wherein:

FIG. 1 is a plan view of the complete educational aid;

FIGURE 2 is a plan view of the printed circuit diagram only and with the circumference of the answer discs outlined thereupon;

FIG. 3 illustrates the markings appearing on the upper row of discs;

FIG. 4 illustrates the markings on the lower row of discs;

FIG. 5 is a section taken on line 5—5 of FIG. 1 and looking in the direction of the arrows;

FIG. 6 is a side view of the proof reader shown in FIG. 1;

FIG. 7 illustrates a modified form of proof reader; and

FIG. 8 is a partial section showing some of the details of FIG. 7.

In FIG. 1 the educational aid is designated generally by the arrow 20. The device comprises a supporting or base plate 21 (FIG. 5) and cover plate 22 of any suitable non-conducting material and which are joined along their two major lengths at 23 and 24 in any convenient manner dependent upon the material used for the two plate members.

The base plate includes on the upper surface thereof the circuit diagram shown in FIG. 2 which is preferably of the printed circuit type although it may also be of conventional wired construction. The invention will now be described with particular reference to its application as an aid for the teaching of the multiplication tables from two to twelve although it will be readily apparent that the number of tables may be increased or decreased as desired, and also that the invention is not to be restricted in its application to multiplication and may readily be used, for example, in the teaching of division, subtraction or addition by merely changing the indicia applied to the discs and to the cards which are to be inserted into the pockets or channels, all later to be described.

Since the invention is being arbitrarily disclosed as an aid in the teaching of eleven multiplication tables, eleven circuits are provided and are numbered from two to twelve in the aligned gaps at the right hand side of FIG. 2, each of the numbers representing a circuit for that particular table. The circuits are preferably laid out in rectangular form as shown and each has a total of twelve gaps, breaks or interruptions numbered from 25 to 36 in the circuit representing the two's table.

The corresponding breaks in each circuit lie in a semicircular path. Twelve answer discs numbered 25' to 36' (FIGS. 3 and 4) each include along the outer periphery of the upper surface thereof a total of eleven predetermined numbers as illustrated, each number being the product of multiplication factors to be solved, only one correct answer for any given problem appearing on each disc. The outline of each of these discs with respect to its superposed position to the circuit diagram is shown in FIG. 2.

Each of the answer discs is mounted on a vertically extending spindle 37 intermediate the base and cover plates, a knob 38 being affixed to the upper end of the spindle above the cover plate. Each disc further includes a pair of conductors 39 and 40 attached to its underside in 180 degree spaced relation, each of the conductors having a horizontal portion extending to approximately the periphery of the disc or slightly beyond and of a width and extent sufficient to bridge the particular gap or break in each of the circuits with which it may be rotated to come into contact. A spacer 41 is interposed between each disc and the upper cover plate and may be affixed to the spindle to prevent the latter from being withdrawn. In the solution of any given problem only one of the conductors of each disc is effective to close a break in the circuit, depending upon the rotational position of that disc.

The cover plate includes on its underside two channels or pockets 42 and 43 extending substantially the full length thereof and into which are insertable cards 44 and 45, selective pairs of which have imprinted thereon a set of multiplication factors to be solved, the factors from one to six times a given number appearing on one of that pair and the factors from seven to twelve times that number appearing on the second card, all in aligned relation with the discs as seen in FIG. 1, openings or windows 46 appearing in the cover plate to allow each of the factors to be visible.

Further openings or windows appear at 47 in the cover plate just above the twelve o'clock position of each disc to permit the answer selected on the disc to be visible to the player. A series of pairs of slots 48 is located at the right hand side of the cover plate and in alignment with the ends of the circuits shown in FIG. 2 and is adapted to receive thereinto a set of probes 49 and 50 connected via an insulated handle 51 to a light bulb 52 and dry cell 53 mounted on any suitable platform 54, and may jointly be termed a proof reader.

In operation, a pair of cards 44 and 45 is selected having imprinted thereon the particular multiplication table desired to be solved, and the card having the lower half of the table is inserted into the upper channel as seen in FIG. 1 and the second card is inserted into the lower channel. The cards may have enlarged tab or gripping portions at the right hand sides thereof and are inserted into the channels until these tabs abut the right hand side of the device whereupon the problems will have been prelocated to appear in the windows 46.

Next, each of the discs is rotated by means of its knob 48 until the correct answer appears in its window 47. If the correct answer has been selected, one of the conductors 39 or 40 will bridge or close one of the gaps 25 to 36 in each instance until the circuit is complete except for the gap at the ends of the circuit and into which the probes are to be inserted. In the illustration shown in FIG. 1 all of the gaps in the two's circuit, or the outermost circuit shown in FIG. 2, will have been closed. Now, upon insertion of the probes into the slots corresponding to that circuit, the bulb 52 will light up indicating the correct choice of answers for all twelve problems. If one incorrect answer had been selected to appear in the window 47, neither of the conductors 39 or 40 would close the corresponding gap in the two's table and the bulb would then not light up indicating an error in one or more of the selections.

A modified form of proof reader is shown in FIGS. 7 and 8. In this instance the ends of the circuits lead into conductor plates 55 and 56, one of the plates being connected into one of the ends of all the circuits and the other plate into the other end of all the circuits. A check disc 57 is mounted in alignment with discs 25' to 30' and has imprinted along its outer upper periphery the same indicia as appears on disc 25'. This disc 57 includes a light bulb 58 extending vertically through the axis thereof which may be encompassed by a transparent knob 59 affixed to the bulb. Conductors 60 and 61 are interconnected preferably to cylindrical contact of the bulb and are similar in configuration and location to the conductors 39 and 40 of the answer discs. A fixed connector and conductor 62 bridges the second or lowermost contact of the bulb and conductor 55. Gaps appear in each of the circiuts under disc 57 in the same location as the gaps under disc 25'. Opposite ends of a dry cell 63 are connected to conductors 55 and 56 as shown in FIG. 7. A window 64 appears in the cover plate in the same relative position as windows 47.

In this form of the proof reader all that is necessary to check the accuracy of the selected answers appearing in windows 47 is to have appear in window 64 the number corresponding to the multiplication table to be solved.

While two embodiments of the invention have been disclosed, it is to be understood that the inventive concept may be carried out in a number of ways. The invention is therefore not to be limited to the precise details disclosed, but is intended to embrace all variations and modifications falling within the spirit of the invention and the scope of the claims.

What I claim is:

1. An educational aid comprising a base member, a plurality of circuits incorporated in said base member in spaced, parallel relation at least along a portion of the length thereof, a cover member, a series of discs interposed between said base and cover members support means in said cover member for a replaceable problem card, a problem card insertable therein and adapted to contain problems equal in number and related to each of said discs, answer indicia on said discs located along the periphery of each of the discs, at least one conductor associated with the underside of each of said discs, gaps in each of said circuits in underlying relation with each of said discs adapted to be closed selectively by said conductor, and means for indicating the successful completion of one of said circuits completion of a given circuit being effected only upon proper selection of one of said answer indicia on each of said discs corresponding to the problem related to each said disc.

2. An educational aid according to claim 1 wherein the gaps in said circuits associated with a particular disc extend in an arcuate path and wherein a pair of conductors are provided for each disc adjacent the extremities of a diameter of said disc.

3. An educational aid according to claim 2 wherein said discs extend along two aligned, parallel rows, and means are provided in said cover member for containing a problem card for each of said rows.

4. An educational aid according to claim 1 wherein said indicating means comprises a bulb connected to a dry cell, and a pair of prongs connected to said dry cell and bulb and adapted to be selectively engaged with each of said circuits.

5. An educational aid according to claim 1 which includes openings in said cover member to expose one of the indicia of each of said discs.

6. An educational aid according to claim 5 wherein said indicating means comprises a pair of prongs interconnected to a dry cell and bulb.

7. An educational aid according to claim 1 wherein said indicia on said discs correspond to the result of multiplication factors.

8. An educational aid according to claim 1 wherein said discs are aligned in two parallel rows, problem card supporting means associated with each of said rows adapted to render visible a plurality of multiplication factors, said indicia on said discs corresponding to the results of said factors, one correct result for given factors appearing on a given disc.

References Cited
UNITED STATES PATENTS

| | | | |
|---|---|---|---|
| 2,104,718 | 1/1938 | Dougherty | 35—9 |
| 2,349,066 | 5/1944 | Witter | 35—9.1 |
| 2,970,386 | 2/1961 | Knutson | 35—9.1 |
| 3,070,904 | 1/1963 | Saba | 35—9 |

EUGENE R. CAPOZIO, *Primary Examiner.*

W. GRIEB, *Assistant Examiner.*